(12) United States Patent
Yu et al.

(10) Patent No.: US 7,107,830 B1
(45) Date of Patent: Sep. 19, 2006

(54) WIRELESS TIRE PRESSURE MONITORING SYSTEM (WTPMS) DUAL-SECTIONAL MONITOR SIGNAL TRANSMISSION MODULE

(75) Inventors: Sin Yu, Hsinchu (TW); Guang-Li Chang, Hsinchu (TW); Ming-Kuan Liao, Hsinchu (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 29 days.

(21) Appl. No.: 11/015,976

(22) Filed: Dec. 20, 2004

(51) Int. Cl.
*B60C 23/02* (2006.01)
(52) U.S. Cl. ...................... 73/146.4; 73/146
(58) Field of Classification Search ........ 73/146–146.8
See application file for complete search history.

(56) References Cited

U.S. PATENT DOCUMENTS

| | | | | |
|---|---|---|---|---|
| 4,177,671 A | * | 12/1979 | Ichihara et al. ............ 73/146.5 |
| 4,581,925 A | * | 4/1986 | Crutcher .................... 73/146.8 |
| 4,951,501 A | * | 8/1990 | MacAnally et al. ........ 73/146.8 |
| 5,027,848 A | * | 7/1991 | Leeuwen .................... 137/227 |
| 5,844,131 A | * | 12/1998 | Gabelmann et al. ....... 73/146.8 |
| 6,557,406 B1 | * | 5/2003 | Gabelmann ................ 73/146.5 |
| 6,655,203 B1 | * | 12/2003 | Hsu .......................... 73/146.8 |

* cited by examiner

*Primary Examiner*—Edward Lefkowitz
*Assistant Examiner*—Jermaine Jenkins
(74) *Attorney, Agent, or Firm*—Egbert Law Offices

(57) ABSTRACT

A dual-sectional monitor signal transmission module for Wireless Tire Pressure Monitoring Systems. On one side of this monitor signal transmission module, an air tap is designed, which can be assembled and fixed in the hole of the tire rim. This Monitor Signal Transmission Module and the air-tap are a dual-sectional combination to allow the air-tap to be fittingly snapped into the hole on the tire rim. Moreover, a mounting seat is designed on the Monitor Signal Transmission Module at the end where the air-tap is to be positioned so that the air-tap and the outer-end of the mounting seat can be connected in a counter-screw setup. The Monitor Signal Transmission Module can be easily detached with just a simple step of unscrewing the air-tap when replacing tires.

2 Claims, 7 Drawing Sheets

WIRELESS TIRE PRESSURE MONITORING SYSTEM (WTPMS) DUAL-SECTIONAL MONITOR SIGNAL TRANSMISSION MODULE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention involves a Monitor Signal Transmission Module for Wireless Tire Pressure Monitoring Systems; specifically, this Monitor Signal Transmission Module and the sir-tap are a dual-sectional combination designed for Wireless Tire Pressure Monitoring Systems.

BACKGROUND OF THE INVENTION

A Wireless Tire Pressure Monitoring Systems is an accessory of vehicles. Roughly, it consists of an in-vehicle display unit and an external (in-wheel) monitor signal transmission device. This invention is an improved version of the monitor signal transmission device, which is to be installed in the wheels. Most monitor signal transmission devices currently available in the market are one-unit modules, in which the tire rims and air-taps are bounded together. This type of module is found to have a few problems (described in the following) in actual uses.

Unavoidably, vehicle tires after repeated uses have wear and tears and must be replaced. In the process of replacing tires, the air-tap must also be detached in order to replace the tires. However, during the disassembly, the part of the module tightly attached to the tire rim often has to be forced apart with heavy tool; in result, after repeated treatments, the component often becomes fragile and damages are unavoidable. Therefore, knowing that such one-unit design does not sustain long-term use and causes waste of resources and the monitor signal transmission are still high-price goods in the vehicle accessory market; such non-durable products will not bring the interests of the consumers.

Therefore, with the above-described problem, developing a new and more durable Monitor Signal Transmission Module is indeed anticipated by the consumers and a goal of relevant businesses involved in relevant researches.

In view of which, the creators of this device, who have been involved in developing and designing relevant products for years, evaluated the above aims and designed a module that is highly suitable for practical uses.

BRIEF SUMMARY OF THE INVENTION

This invention improves the following functions.

1. It features an innovative dual-sectional connection mechanism between the Monitor Signal Transmission Module and the air-tap, which provides a new structure for the Monitor Signal Transmission Module used in combination with a Wireless Tire Pressure Monitoring System. The design is the first in the industry; therefore, it meets the innovative criteria of a patent application.

2. With this improved design, the Monitor Signal Transmission Module can be easily detached with just a simple step of unscrewing the air-tap when replacing tires. In effect, its usage life is extended and durability greatly improved to sustain repeated uses, since no damages are made to the unit.

The above descriptions are better implementation examples of the technical features of this invention. Those who are familiar with the technology may alter or change this invention under the principle that the altered product may not deviate from the originality of this invention and such alterations and changes are encompassed in the defined scope of this patent application.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
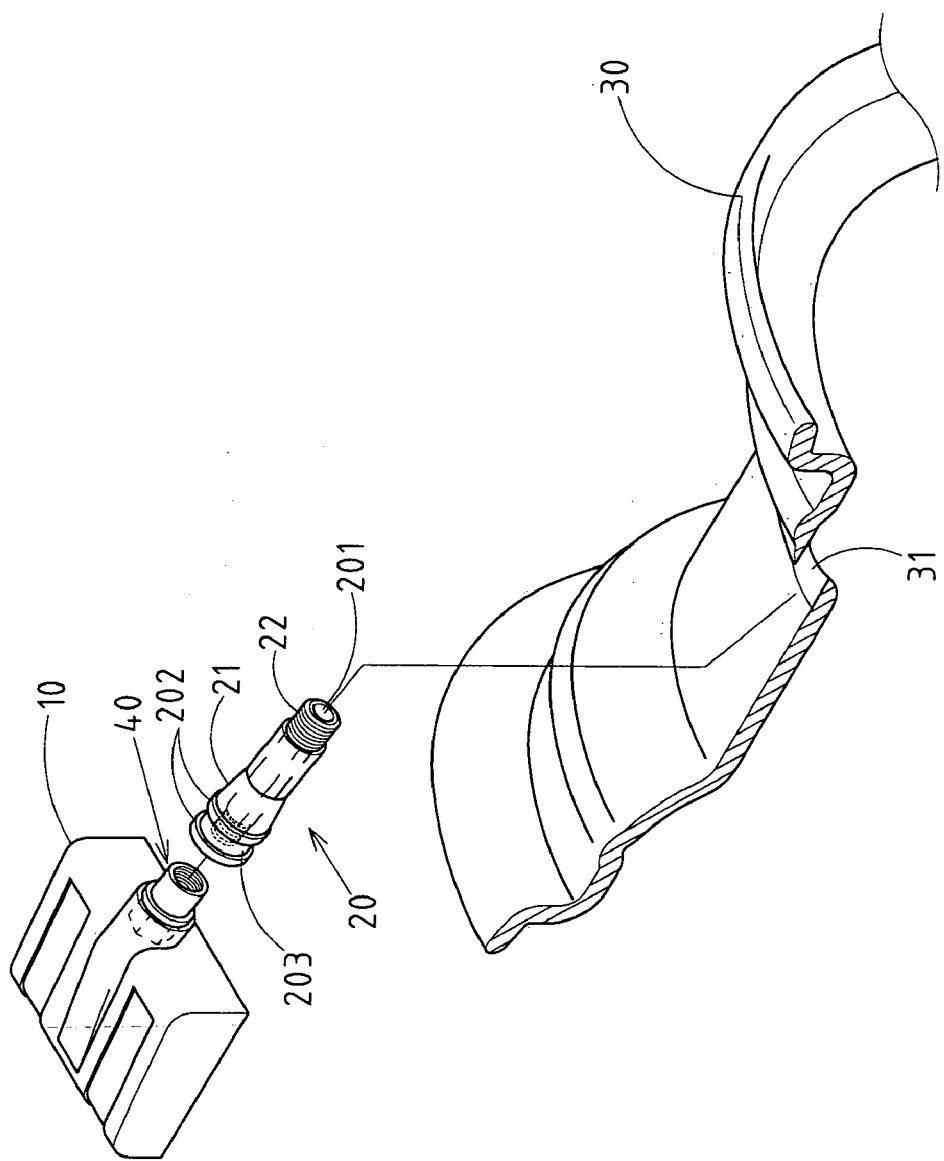
FIG. 1 shows an exploded perspective view and a partial sectional view, respectively, of the main body of the Monitor Signal Transmission Module and the tire-rim.
Figure 2:
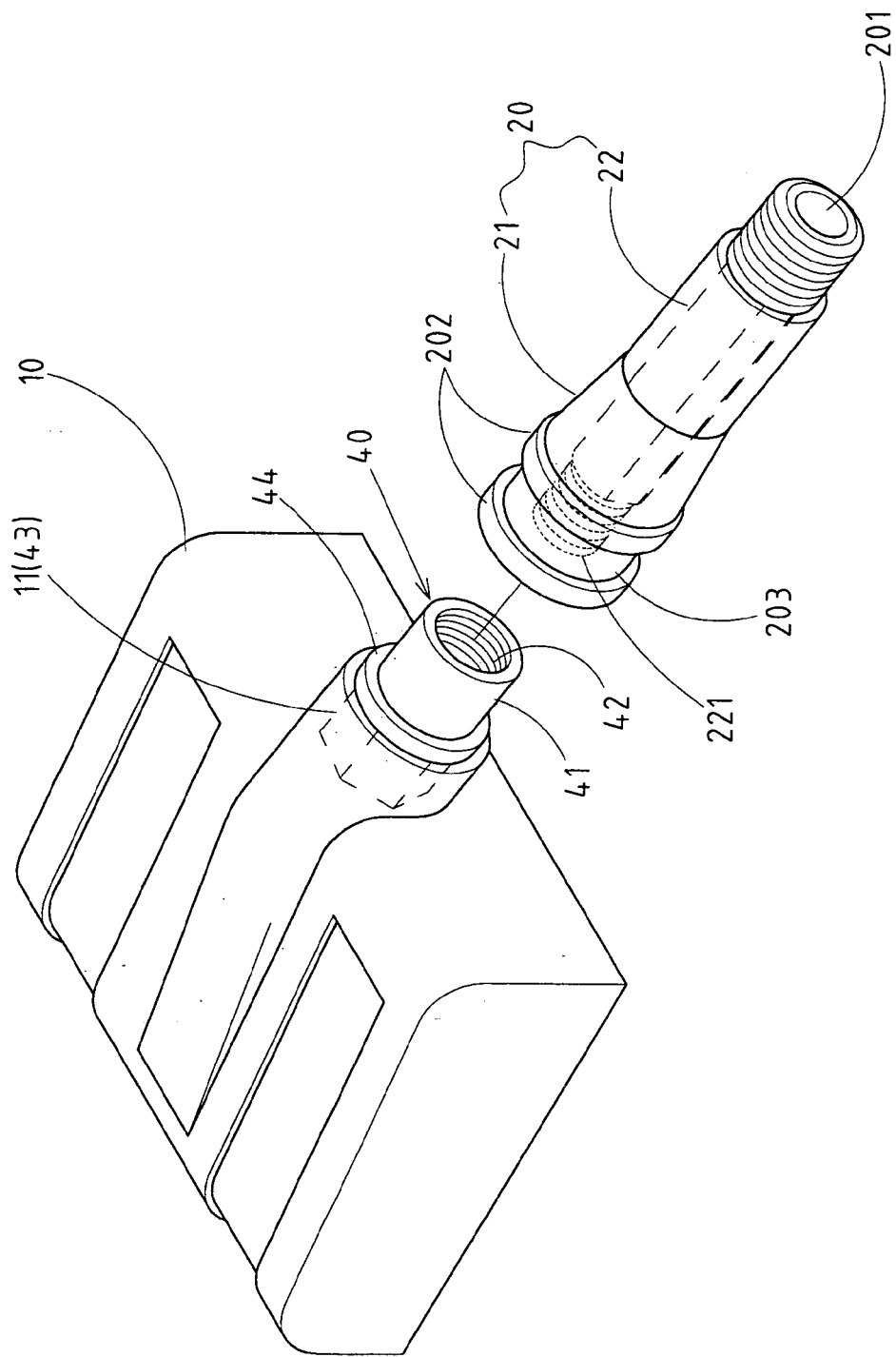
FIG. 2 shows an enlarged perspective view of the main body of the Monitor Signal Transmission Module.
Figure 3:
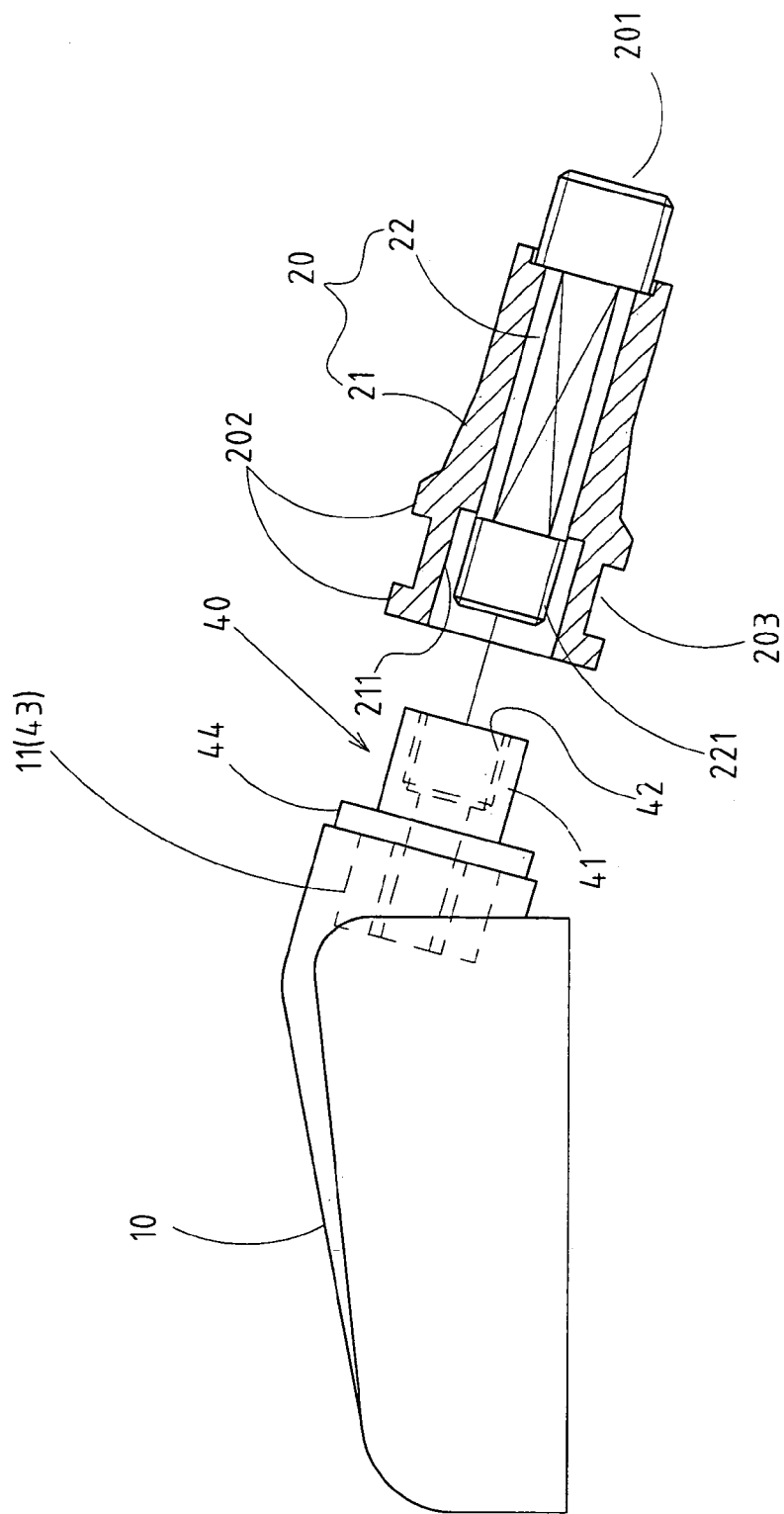
FIG. 3 shows a cross-sectional view of the main body of the Monitor Signal Transmission Module and the tire-rim.

As shown in FIGS. 1, 2, and 3, which are the better implementation examples of the Wireless Tire Pressure Monitoring System Dual-sectional Monitor Signal Transmission Module. The main body of this module 10 has an air-tap 20 on one side. The air-tap can be assembled and positioned on the pre-drilled hole 31 on a tire-rim 30 to allow the air-pump hole 201 at the end of the air-tap 20 to protrude out of the tire-rim 30 for air-pumping. The main characteristics of this module are: the main body 10 of this Monitor Signal Transmission Module 10 and the air-tap 20 are designed with a dual-sectional combination; that is, the outer side of the air-tap 20 is designed with a set of snap-in wedges, which allows the air-tap to be snapped into the hole 31 on the tire-rim 30. In which, this set of snap-in wedges is designed with two spaced rings 202, which the rings 202 form a slot 203 to enable air-tight positioning of the air-tap 20 into the hole on the tire-rim 30. Furthermore, a mounting seat 40 is also designed at the air-tap 20 end of the Monitor Signal Transmission Module; connection between the air-tap 20 and the outer-rim of this mounting seat 40 is achieved by a reverse-tooth screw design. Its detailed structure and implementations are described in the following section.

In this module, the air-tap 20 is formed by a flexible (i.e. rubber material) outer-sleeve 21 and a metal tube 22. On one end of this sleeve 21, there is a sunken-slot 211, which forms the external thread 221, protruding in the center of the sunken-slot 211 at the same end of the metal tube 22. The mounting seat 40 is designed as a step-shape cylindrical metal seat with a protruding tube 41 at the outer end. In the center of the protruding tube 41, a threaded connection slot 42 is in place. The inner end of the mounting seat 40 is a column-shape body 42, the outer side of the mid-section of the mounting seat 40 forms a collared edge 44, and a slot 11 is set at the air-tap 20 end of the Monitor Signal Transmission Module 10. With this combination, the mounting seat 40 can be oriented to snap (can be formed with injection molding) into the slot 11 of the Monitor Signal Transmission Module 40 through the column-shape body 43 at the internal end and positioned by stopping the collared edge 44 at the external part of the module 10. Furthermore, the air-tap 20 can be fitted onto the protruding tube 41 on the mounting seat 41 through the sunken-slot 211, and the column-shape body 43 can then be screwed onto the threaded connection slot 42 on the protruding tube 41 to achieve positioning of the air-tap 20 on the body of the Monitor Signal Transmission Module 10.

Figure 4:
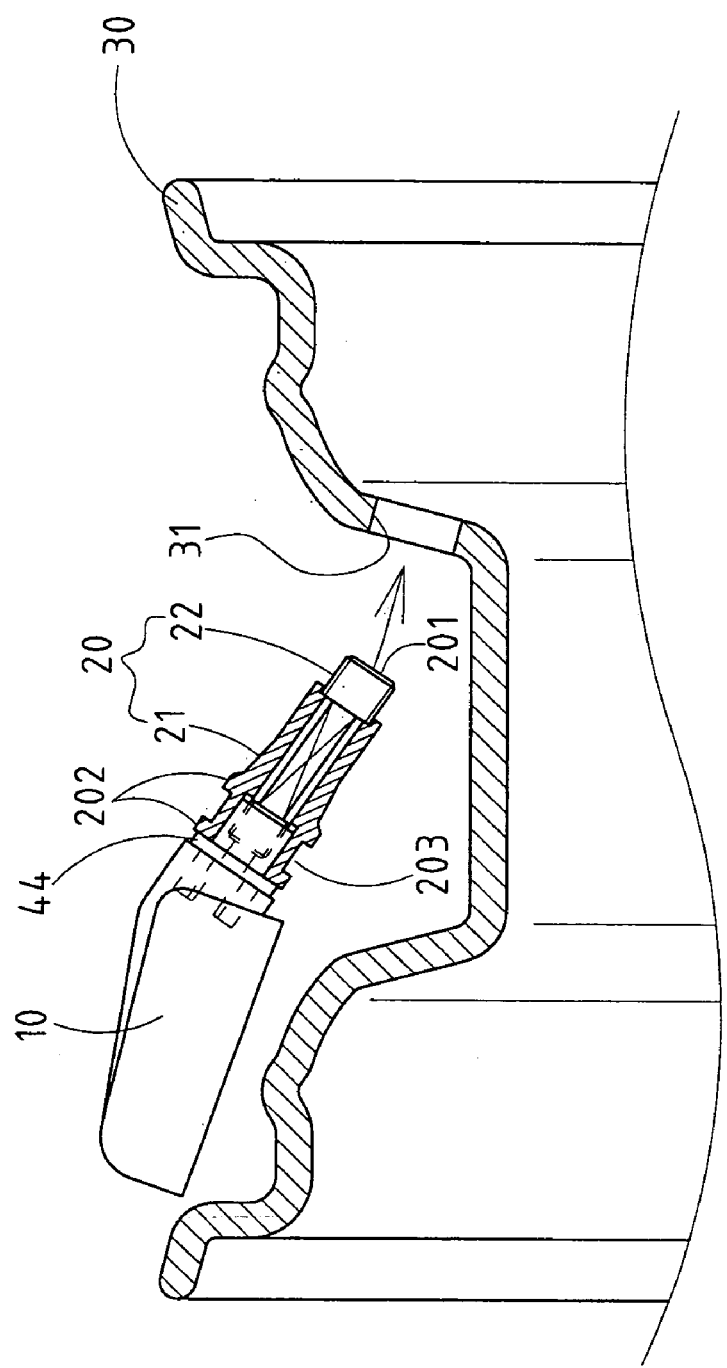
FIG. 4 shows a sectional view of the assembly flow of the Monitor Signal Transmission Module and the tire-rim.
Figure 5:
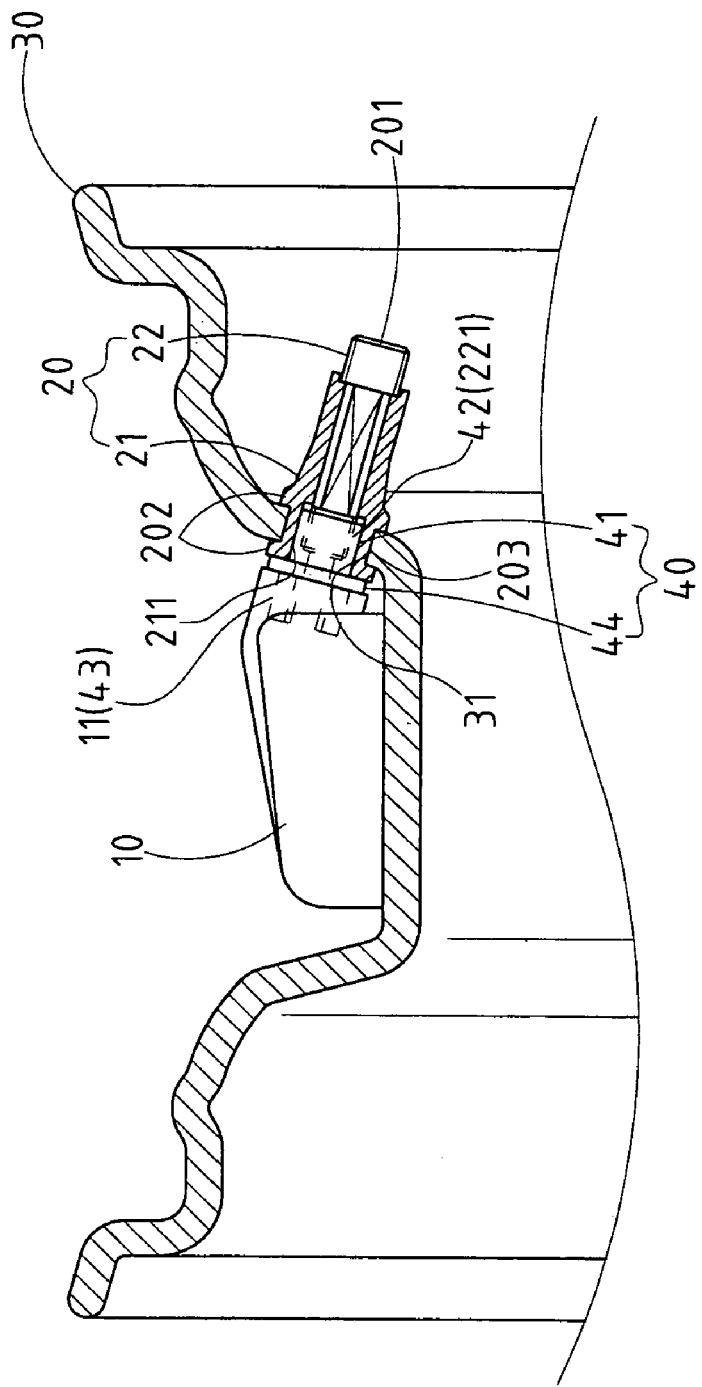
FIG. 5 shows another sectional view of the Monitor Signal Transmission Module-tire-rim combination.
Figure 6:
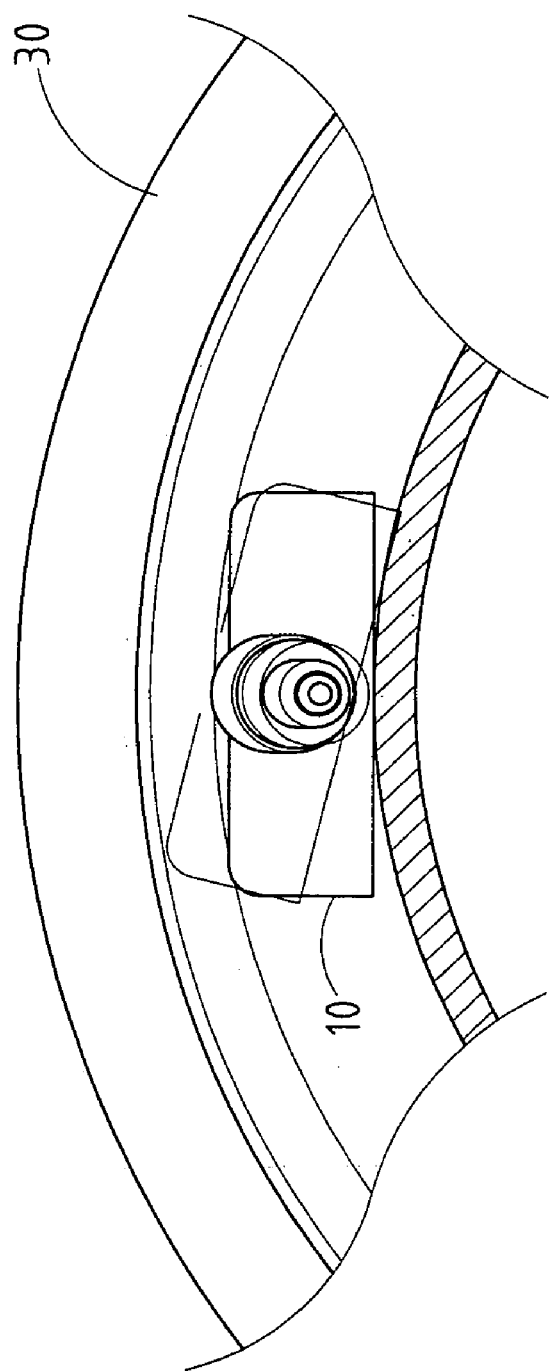
FIG. 6 shows a partial elevation view of the other side of the Monitor Signal Transmission Module inside of the tire-rim.
Figure 7:
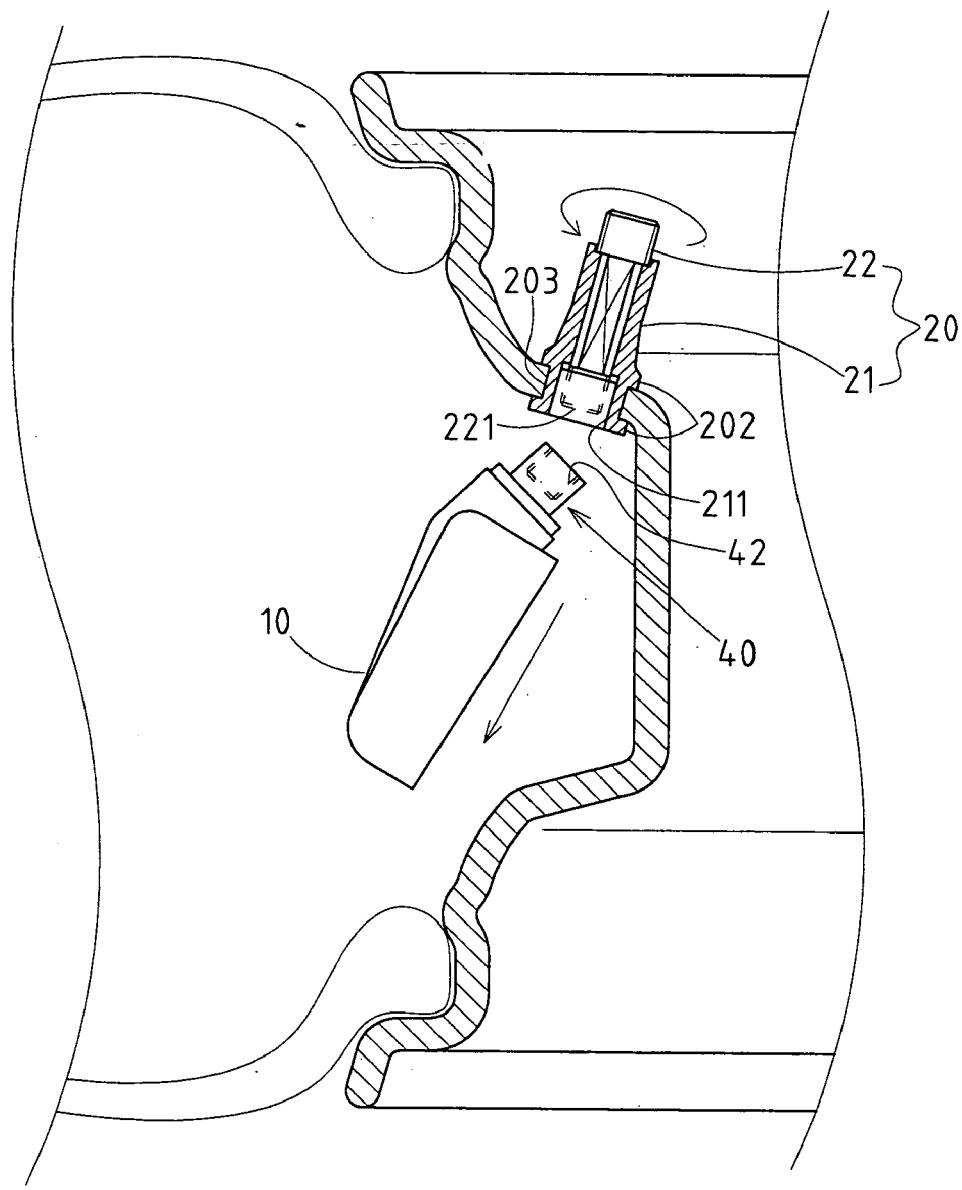
FIG. 7 shows still another sectional view of the air-tap disassembly operation from the outer side of the Monitor Signal Transmission Module.

Through the above structure and combination, assembly of the air-tap 20 (please refer to FIGS. 2, 3, and 4) and the Monitor Signal Transmission Module 10 can be achieved by screwing the air-tap 20 onto the Module 10 first and then snapping the air-tap 20 into the hole 31 on the tire-rim 30 through the snap-in slot 203 (pull out forcibly from inside of the tire-rim). This enables the air-pump hole 201 to protrude out of the tire-rim 30 (as shown in FIG. 5). When replacing tire, before the tire is disassembled, use a tool to hole the outside of the air-tap and turn it counter-wise (as shown in FIG. 6). When turning, one end of the main body of the Monitor Signal Transmission Module 10 will be stopped at the inner wall of the tire-rim and fixed into position. Again, through the counter-tooth screw design of the air-tap 20/mounting seat 40 combination, the air-tap 20 will then be loosened from the mounting seat 40 and the Module 10, together with the mounting seat 40, will fall into the tire due to the departure of the air-tap 20 (as shown in FIG. 7). Next, disassembly of the tire can be carried out and the air-tap 20 can be discarded directly. The Monitor Signal Transmission Module 10 can then be retrieved after the tire is disassembled and reassembled with a new air-tap 20.

We claim:

1. A dual-sectional monitor signal transmission module for Wireless Tire Pressure Monitoring Systems, the module comprising:

a module body and an air tap on one side thereof, said air tap being assembled and fixed in a hole of a tire rim; wherein said module body and said air-tap are a dual-sectional piece allowing said air-tap to be fittingly snapped into the hole on the tire rim; further comprising:

a mounting seat at an end of said module body where the air-tap is to be positioned so that the air-tap and an outer-end of the mounting seat can be connected in a counter-screw setup wherein the air tap is comprised of a flexible outer-sleeve and a metal tube, said outer-sleeve having on one end thereof a sunken-slot, which forms an external thread, protruding in a center of the sunken-slot at a same end of the metal tube, wherein said mounting seat is comprised of a step-shape cylindrical metal seat with a protruding tube at an outer end thereof having a threaded connection slot in a center thereof, an inner end of the mounting seat being a column-shape body, an outer side of a mid-section of the mounting seat forming a collared edge, and a slot being set at the air-tap end of the module body, wherein the mounting seat is orientable to snap into the slot of the module body through the column-shape body at the internal end and positioned by stopping the collared edge at the external part of the module body; and wherein the air-tap is fittable onto the protruding tube on the mounting seat through the sunken-slot, and the column-shape body is screwable onto the threaded connection slot on the protruding tube to achieve positioning of the air-tap on the module body.

2. The module defined in claim 1, wherein a fitting part at the outer rim of a sir-tap is comprised of two spaced wedges; wherein, through the slot formed by the two wedges, the module body is snappable into the hole on the tire-rim to achieve air-tight connection.

* * * * *